United States Patent
McKay

(10) Patent No.: US 7,372,230 B2
(45) Date of Patent: May 13, 2008

(54) OFF-AXIS ROTARY JOINT

(75) Inventor: Robert Fisher McKay, Fall River (CA)

(73) Assignee: Focal Technologies Corporation, Dartmouth, Nova Scotia (CA)

( * ) Notice: Subject to any disclaimer, the term of this patent is extended or adjusted under 35 U.S.C. 154(b) by 225 days.

(21) Appl. No.: 11/406,038

(22) Filed: Apr. 18, 2006

(65) Prior Publication Data

US 2006/0260832 A1 Nov. 23, 2006

Related U.S. Application Data

(60) Provisional application No. 60/675,335, filed on Apr. 27, 2005.

(51) Int. Cl.
*G05B 19/04* (2006.01)

(52) U.S. Cl. .............................. 318/568.2; 318/568.22; 318/567; 318/569

(58) Field of Classification Search ............. 318/568.2, 318/568.21, 568.23, 568.24, 569, 567, 568.11, 318/34; 901/15, 28; 181/273, 174
See application file for complete search history.

(56) References Cited

U.S. PATENT DOCUMENTS

2006/0086564 A1* 4/2006 Kostun et al. .............. 181/250

\* cited by examiner

*Primary Examiner*—Karen Masih
(74) *Attorney, Agent, or Firm*—Phillips Lytle LLP

(57) ABSTRACT

An off-axis rotary joint (20) for selectively enabling communication of a signal (i.e., electrical and/or optical) between a housing (21) mounted for rotation about an axis (y-y) relative to a hollow shaft assembly (22) at all permissible relative angular displacements (e.g., 0°, 180°, 360°, 540°, 720°, etc.) between the housing and shaft assembly, broadly includes: a first conductor (23) having an first end mounted on the second member and having a second end mounted on the first member, the first conductor being adapted to convey a signal between its ends; a first motor (24) operatively arranged to selectively rotate the first conductor first end through a desired angular displacement relative to the second member; a second conductor (25) having an first end mounted on the second member and having a second end mounted on the first member, the second conductor being adapted to convey a signal between its ends; a second motor (26) operatively arranged to selectively rotate the second conductor second end through a desired angular displacement relative to the first second member; an encoder (28) for monitoring the angular displacement of the first member relative to the second member; a first divider/combiner (29) communicating with the second end of each of the conductors; a second divider/combiner (30); a first connector (31) mounted on the first member for selectively communicating the first and second divider/combiners through the first conductor; a second connector (32) mounted on the first member for selectively communicating the first and second divider/combiners through the second conductor; and a controller (33) for selectively operating the first and second motors and the first and second connectors; whereby a signal may be conveyed though the joint at all permissible angular displacements of the housing relative to the shaft assembly.

15 Claims, 3 Drawing Sheets

OFF-AXIS ROTARY JOINT

CROSS-REFERENCE TO RELATED APPLICATION

This application claims the benefit of the earlier filing date of provisional U.S. patent application Ser. No. 60/675,335, filed on Apr. 27, 2005.

TECHNICAL FIELD

The present invention relates generally to the field of off-axis rotary joints, and, more particularly, to improved off-axis rotary joints that enable communication of a signal between a housing mounted for rotation about an axis relative to a shaft assembly at all permissible relative angular displacements between the housing and shaft assembly.

BACKGROUND ART

The use of fiber optic transmission techniques is now well accepted in telephone and data transmission arts. Optical multiplexing to enable each fiber to carry a great multitude of data and voice channels is also well understood. Several applications require the passage of power or communication signals (e.g., voice, video, data streams, etc.) across an interface between a rotating reference frame and a non-rotating or stationary reference frame.

One such application is a turret for a Floating Production, Storage and Offloading System ("FPSO"), a moored ship-shaped facility capable of producing oil from subsea wells and for loading and offloading the oil into shuttle tankers, a common scheme when pipeline infrastructure is not available. A critical part of the FPSO is the turret transfer system that provides the ability for an FPSO to weathervane (i.e., allowing the ship to take the position of least resistance relative to the wind, waves and currents) around the mooring, thus minimizing the loading imposed by the environment. The most common solution is a swivel system with the ship attached to, but free to rotate continuously about, a vertically-disposed mooring that is anchored to the seabed. The swivel includes electrical slip rings to power submerged pumps and other equipment and for transmission of low data rate signals, along with fluid rotary unions for passing certain chemicals used in the oil and gas recovery process, as well as for the pumping the product itself from the subsea wells.

As data transmission rate requirements have increased, to take advantage of multiplexing technologies and to link multiple oil rigs to the FPSO possibly over distances, it has become desirable to include fiber optic communications through the turret system, requiring a fiber optic rotary joint. Multiple fibers are required to tie into separate fields, for redundancy, and to separate various vital and non-vital signals. Passive solutions without regeneration through electrical and electro-optic means are desired for safety, maintenance and reliability reasons. Current FPSO systems commonly require from ten to twenty optical fibers, typically all singlemode, with a desired throughbore diameter of 30 cm or more for fluid passage.

A conventional multiple-fiber optic rotary joint is provided by Focal Technologies of Dartmouth, Nova Scotia, Canada, which allows fifteen or more optical fibers to be feed into and out of the joint (see, e.g., U.S. Pat. No. 4,725,116). Other multiple-channel fiber optic rotary joint have been proposed. A number of these use derotating prisms (see, e.g., U.S. Pat. Nos. 4,109,997 and 5,157,745), but, like the Focal design, all are on-axis designs with optical and mechanical elements occupying the central region proximate the axis of rotation. In many rotating applications, it is desirable to use the central region for other equipment or media. Hence, the hollow-bore requirement, and the need for an off-axis rotary joint.

A number of off-axis fiber optic rotary joints are reported (see, e.g., U.S. Pat. Nos. 4,027,945, 4,525,025, 4,943,137, 4,934,783, 5,297,225 and 6,104,849), but none are suited to the FPSO turret requirement. All display high optical losses that require active regeneration of signals, and are impractical for a multiplicity of singlemode optical fibers.

Another solution for some rotary coupling requirements includes limited rotation schemes; that is, solutions that can only turn in one direction for a limited number of rotations before reversal of direction is required. One example is U.S. Pat. No. 5,078,466, wherein a ribbon containing many optical fibers is allowed to coil and uncoil like a clock spring. A variety of other cable spooling mechanisms are reported (see, e.g., U.S. Pat. Nos. 3,822,834 and 5,921,497) that offer a limited number of turns for winch applications and the like. These are not suited to the intended FPSO application as they would need to be rewound with the intervention of a tugboat or other means to break and reset the connection through manual intervention.

Accordingly, there is a need for an improved off-axis rotary joint that will be less expensive to manufacture, that will be capable of operating in an automatic and unattended manner, and that is particularly suited for use in FPSO applications.

SUMMARY OF THE INVENTION

In the following description, two limited rotation devices ("LRD"), each with a free or hollow-bore, are combined, but are used alternately, to provide continuous bi-directional rotation of a housing about a shaft assembly for a large number of optical fibers, as well as electrical conductors. Each LRD is individually capable of only a finite number of revolutions, but an active indexable coupling system and motor drive mechanism between the two LRDs, allows continuous rotation and unimpeded rotation of the housing about the shaft assembly. Such rotation is limited by the response times of the motion control elements, but, for a case like the FPSO, that may only involve something on the order of two revolutions per day, and is usually not an issue. The invention may operate automatically and unattended.

With parenthetical reference to the corresponding parts, portions or surfaces of the disclosed embodiment, merely for purposes of illustration and not by way of limitation, the present invention provides a improved rotary joint for selectively enabling communication of a signal (i.e., electrical and/or optical) between a first member (e.g., a housing) mounted for rotation about an axis (y-y) relative to a second member (e.g., a shaft assembly) at all relative angular displacements (e.g., 0°, 46°, 180°, 311°, 360°, 540°, 720°, 755°, etc.) between the first and second members.

The improved joint (20) broadly includes: a first conductor (23) having an first end mounted on the second member and having a second end mounted on the first member, the first conductor being adapted to convey a signal between its ends; a first motor (24) operatively arranged to selectively rotate the first conductor first end through a desired angular displacement relative to the second member; a second conductor (25) having an first end mounted on the second member and having a second end mounted on the first member, the second conductor being adapted to convey a signal between its ends; a second motor (26) operatively arranged to selectively rotate the second conductor second end through a desired angular displacement relative to the first second member; an encoder (28) for monitoring the angular displacement of the first member relative to the second member; a first divider/combiner (or switch) (29) communicating with the second end of each of the conductors; a second divider/combiner (or switch) (30); a first connector (31) mounted on the first member for selectively communicating the first and second divider/combiners through the first conductor; a second connector (32) mounted on the first member for selectively communicating the first and second divider/combiners through the second conductor; and a controller (33) for selectively operating the first and second motors and the first and second connectors; whereby a signal may be conveyed though the joint at all angular displacements of the first member relative to the second member.

The signal may be electrical, and the first and second conductors may be electrical conductors. Alternatively, the signal may be optical, and the first and second conductors may each include one or more optical fibers.

The shaft assembly may have a hollow axial throughbore.

The signal may pass in either direction. More particularly, the signal may pass from the first divider/combiner to the second divider/combiner, or from the second divider/combiner to the first divider/combiner. Signals may pass in either direction.

In the preferred embodiment, each connector includes two terminals (39, 41) for the signal, and includes a solenoid (44) for selectively moving the terminals relatively toward and away from one another.

The encoder may be arranged to continuously monitor the angular displacement for the first member relative to the second member.

The signal may pass through one, but not the other, of the conductors. Alternatively, the signal may pass through both conductors, at least for a short period of time.

In the preferred embodiment, the motor associated with the other of the conductors is operated to angularly displace such other conductor to a desired (e.g., centered) position relative to the second member.

The controller may selectively disable communication of the signal through the one of the conductors, and may enable communication of the signal through the other of the conductors, when the first member has been angularly displaced through a predetermined distance (e.g., near the end of its permissible rotational movement) relative to the second member.

Accordingly, the general object of this invention is to provide an improved rotary joint.

Another object is to provide an improved rotary joint for selectively enabling communications of a signal between a first member mounted for rotation about an axis relative to a second member at all permissible angular displacements between the first and second members.

Still another object is to provide an improved rotary joint for selectively enabling communications of a signal between a first member mounted for rotation about an axis relative to a second member at all permissible angular displacements between the first and second members, though the indexing use of limited rotation devices.

These and other objects and advantages will become apparent from the foregoing and ongoing written specification, the drawings and the appended claims.

DETAILED DESCRIPTION OF THE PREFERRED EMBODIMENTS

Figure 1:
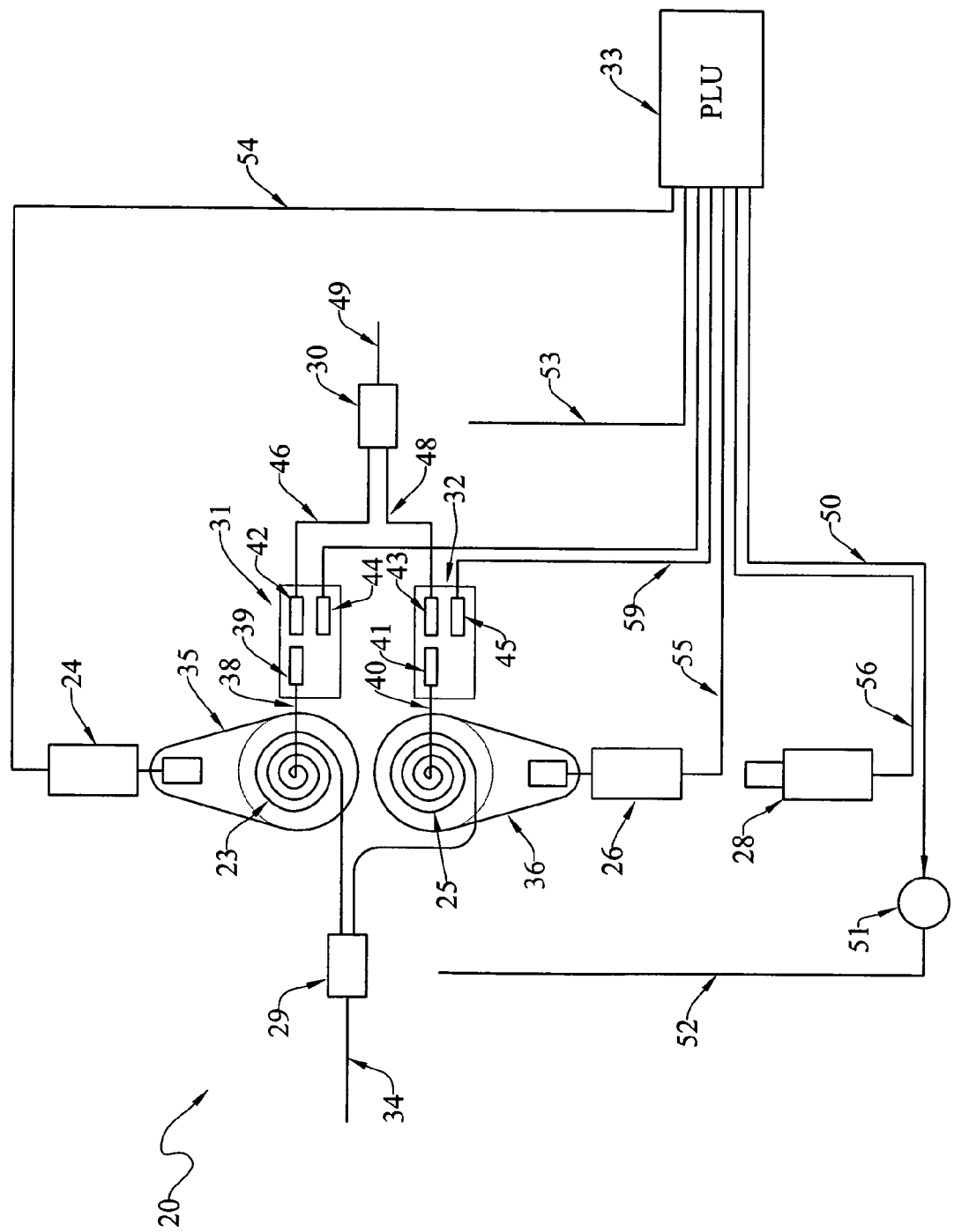
FIG. 1 is a block diagram of the improved off-axis rotary joint.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention broadly provides an improved rotary joint for selectively enabling communication of a signal between a first member (e.g., a housing) mounted for rotation about an axis (y-y) relative to a second member (e.g., a shaft assembly) at all permissible relative angular displacements between the first and second members.

Figure 2:
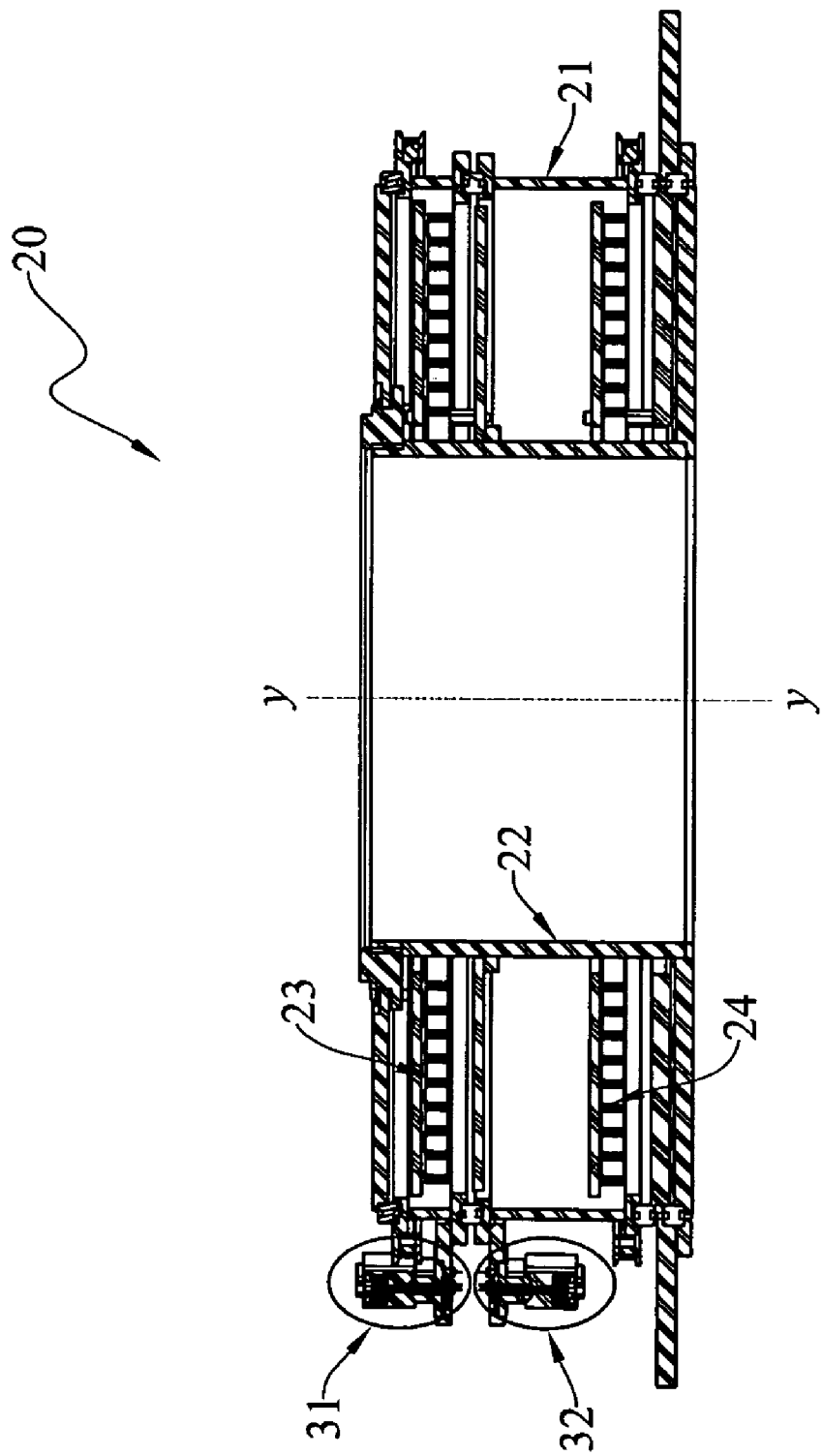
FIG. 2 is a fragmentary longitudinal sectional view of the improved off-axis rotary joint.

The improved joint is generally indicated at 20 in FIGS. 1 and 2. Certain structure of the joint is shown in greater detail in FIGS. 2 and 3. In FIG. 2, the first member is shown as being an outer housing 21 that is mounted on an inner hollow shaft assembly 22 for rotation about the vertical axis y-y of the shaft assembly.

Adverting now to FIG. 1, the signal may be either an electrical signal or an optical signal. The improved rotary joint is shown as broadly including a first conductor 23, a first motor 24, a second conductor 25, a second motor 26, an encoder 28, a first divider/combiner 29, a second divider/combiner 30, a first connector 31, a second connector 32, and a controller 33.

In FIG. 1, the first and second conductors 23, 25 are shown as being limited rotation devices, and are journalled by suitable bearings on the shaft assembly. More particularly, each conductor is schematically indicated as being a helically-wound coil, having its center mounted on the shaft assembly. Each coil may be wound by rotating the conductor in a counterclockwise direction about the shaft assembly, or may be unwound by rotating the conductor in a clockwise direction relative to the shaft assembly. Persons skilled in this art will readily appreciate that there are practical limits to the extent to which each conductor may be wound or unwound, as discussed infra.

In the embodiment shown in FIG. 1, an optical signal is communicated between the shaft assembly and the housing. More particularly, the optical signal is provided via optical fiber 34 to the first divider/combiner 29, where such supplied signal is divided by half in intensity and sent to the entrance ends of the first and second conductors. Each divider/combiner has an insertion loss of about 3 dB The first motor 24 is depicted as being a bi-directional synchronous motor that is arranged to selectively rotate a toothed belt 35 that surrounds the shaft assembly. Similarly, the second motor 26 is shown as being operatively arranged to selectively rotate a toothed belt 36 in the appropriate angular direction relative to the shaft assembly axis. Each conductor has its first end mounted on the shaft assembly, and is rotatable thereabout. Thus, if the motor rotates the associated conductor in a clockwise direction, the associated conductor will be unwound about the shaft assembly. Conversely, if a motor rotates its associated conductor in a counterclockwise direction, the associated conductor will be wound about its shaft assembly. Each motor is operatively arranged to rotate its associated conductor first end in the appropriate angular direction and through a desired angular displacement (e.g., 0°, 46°, 180°, 311°, 360°, 540°, 720°, 755°, or whatever) relative to the housing.

The optical signal from the first conductor is conveyed via optical fiber 38 to a terminal or lens 39 in first connector 31. Similarly, the signal is supplied from the second conductor via optical fiber 40 to lens or terminal 41 in second connector 32. Each connector has another lens or terminal, indicated at 42, 43, respectively, and a solenoid-type actuator, indicated at 44, 45, respectively, for selectively moving the lenses or terminals toward and away from one another, as desired. The optical signals are provided from lenses 42 and 43 via optical fibers 46 and 48, respectively, to the second divider/combiner 30. The second divider/combiner sums, adds or combines the two signals, and provides them to an output optical fiber 49. If the conductors are used alternately, the signal in line 49 will be the signal passing through the "active" conductor. If used together, the signal in line 49 will be the summed signals passing through both conductors. Electrical communication from the programmable logic controller ("PLC") 33 is provided via conductor 50, slip ring 51 and conductor 52 to the first divider/combiner 29. The PLC also communicates with the second divider/combiner via conductor 53. The PLC is arranged to provide appropriate power signals to first motor 24 via conductor 54, and to second motor 26 via conductor 55.

The encoder 28 continuously determines and monitors the angular displacement of the housing relative to the shaft assembly, and provides a signal via conductor 56 to the PLC. The PLC provides appropriate signals to solenoids 44 and 45 via conductors 58 and 59, respectively.

In FIG. 2, the first and second connectors are indicated at 31 and 32, respectively, and are shown as being mounted on the housing.

Figure 3:
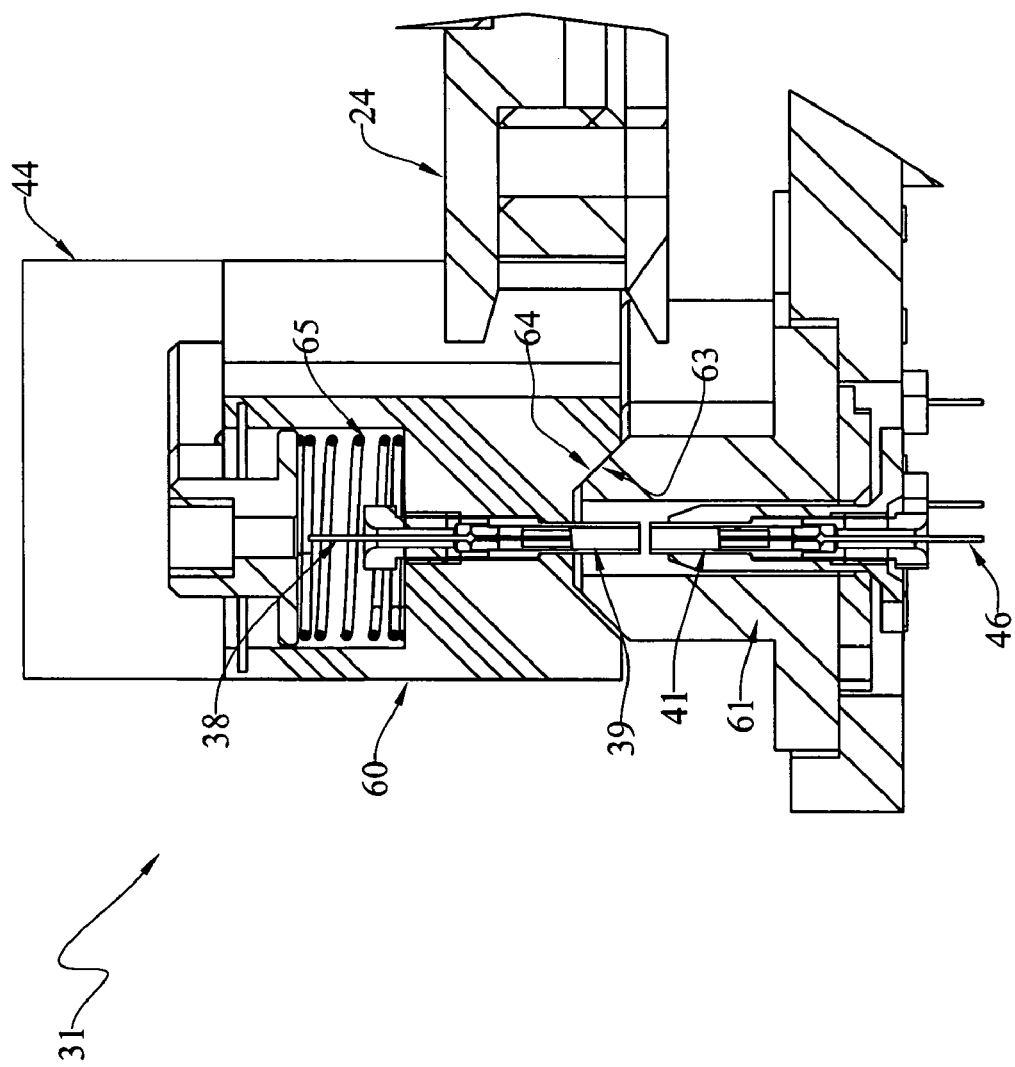
FIG. 3 is an enlarged longitudinal sectional view of one of the optical connectors.

FIG. 3 is an enlarged view of the first connector. In FIG. 3, the first connector is shown as having the two lenses 39, 41, mounted within bodies 60, 61, respectively. The upper body 60 is adapted to be moved in a vertical direction both toward and away from the lower body 61 by means of solenoid, schematically indicated at 44. The upper body has a downwardly- and inwardly-facing frusto-conical surface 63, which is designed to abut an upwardly- and outwardly-facing frusto-conical surface 64 on lower body 61 when bodies 60, 61 are moved toward one another. These two facing frusto-conical surfaces tend to center and align lenses 39, 41 in a radial direction with respect to one another. The two halves float somewhat, and the frusto-conical fit provides a very low optical insertion loss through the connector, even for a singlemode fiber, typically less that 3 dB. Although the mechanical system is an active one, the optical signal remains optically end-to-end, and is therefore passive, as desired. The optical insertion loss end-to-end will include the two divider/combiners, and the optical coupling of the connector, for a typical total loss of under 10 dB. This is reasonable given the typical optical budget of laser-based optical fiber systems. A return spring 65 urges the upper body 60 to move downwardly into engagement with the lower body.

While these two aligned lenses are appropriate for the optical environment, if the signal to be conveyed were an electrical signal, the upper body might carry pins, and the lower body might carry recesses to receive such pins and to make electrical contact, and close an electrical circuit therebetween.

The device is assembled as shown in FIGS. 2 and 3. As indicated above, one use of the improved rotary joint is in providing a platform or terminal about which a ship may weathervane. The improved joint is described as being an off-axis joint in that the hollow center of shaft assembly 22 is available for conveyance of one or more fluids, such as oil from an undersea well to a surface terminal.

The improved apparatus selectively indexes the two conductors to permit such low frequency weathervaning or rotation of the ship about the terminal. Such movement of the ship translates to rotation of the housing about the shaft assembly. Such weathervaning is typically of low frequency, and may be on the order of two revolutions per day, or the like. In any event, during normal operation, one of the conductors is in an "active" mode to convey the signal between the housing and the shaft assembly, while the other conductor is in an "inactive" or "standby" mode. The connector of the "active" conductor is engaged, as shown in FIG. 3, so as to permit the signal to be conveyed between the housing and the shaft assembly. As the moored ship weathervanes about the joint, the housing rotates about the shaft assembly. This causes the "active" conductor to selectively wind or unwind, as appropriate. The solenoid of the "inactive" connector is first physically separated. Thereafter, its associated motor is operated to rotate the first or inner end of the associated conductor back to a centered or neutral position relative to the shaft assembly. By this, it is meant that the associated conductor may be either wound or unwound toward an approximate midpoint between its limits. Once in this position, the associated connector may be de-energized in the appropriate angular position to allow communication of the signal through its lenses.

Thus, the invention normally operates by indexing the respective conductors. As one is "active", the other is "inactive", and returned back to a neutral position. Thereafter, as the "active" conductor approaches one of the extents of its permissible movement, the second conductor becomes "active" to allow the signal to be passed therethrough. Thereafter, the first initially-"active" conductor becomes "inactive", and its motor is operated to return its first end back to a centered position relative to the shaft assembly. Thus, by alternately indexing the respective conductors, the invention may allow unlimited weathervaning of the moored ship about the terminal, without regard to the fact that each of the coils is itself a limited rotation device.

Therefore, the invention broadly provides an improved rotary joint for selectively enabling communication of a signal (either electrical or optical) between a first member (e.g., a housing) mounted for rotation about an axis (y-y) relative to a second member (e.g., the shaft assembly) at all permissible relative angular displacements between the first and second members. The cumulative angular displacement of the housing relative to the shaft assembly is monitored by the encoder, which provides its signal via line 56 to the PLC. The PLC then, in turn, controls operation of the motors and solenoids, as necessary, such that the improved apparatus may operate automatically and in an unintended manner.

The signal, whether optical or electrical, may be transmitted bi-directionally; that is, from the shaft assembly to the housing, or vice versa.

Modifications

The present invention contemplates that many changes and modifications may be made. For example, each divider/combiner may be a switch, such as one controlled by a signal provided from the PLC. Typically, the optical configurations are bi-directional and usual optical wavelength division schemes can be employed to increase the number of signals per optical fiber.

Standard fiber optic splitters and combiners can cause signal degradation in singlemode fibers due to interference effects, particularly with highly coherent and polarized sources. To insure reliable data transmission with singlemode systems, other techniques to recombine or select optical signals can be employed.

One such technique uses polarization. Since orthogonal polarizations do not interfere, splitting out the input signal by polarization and recombining at the other end with a polarization splitter/combiner avoids interference problems. Polarization maintaining (PM) fiber must be used in the system, and the system must be tailored to a specific range of wavelengths. For highly linearly polarized sources (i.e, having high DOP), a polarization scrambler or depolarizer may be needed on the inputs to balance the optical power form the polarization splitters.

A second technique uses a pair of voltage-controlled optical attenuators added at the outputs of the splitter. To avoid interference, particularly when the signals on the splitter outputs are roughly equal in optical intensity, the attenuators may be controlled such that only one allows optical power trough at any one time. The profile of the control signal may be optimized to reduce interference during the crossover period.

The mechanism for rotating the first or inner end of the conductor about the shaft assembly may include a toothed belt acting between geared wheels and pinions, or some other device, as desired. The conductors may be optical, electrical, or a combination thereof. If optical, a plurality of optical signals may be conveyed, either along multiple discrete fibers, or along one or more multimode fibers. The encoder is preferably arranged to continuously monitor the angular displacement of the first member relative to the second member. However, in an alternative embodiment, such monitoring could be intermittent, as desired. Controllers other than PLC's might also be used.

Therefore, while the presently preferred form of the improved rotary joint has been shown and described, and several modifications thereof discussed, persons skilled in this art will readily appreciate that various additional changes and modifications may be made, as defined and differentiated by the following claims.

What is claimed is:

1. A rotary joint for selectively enabling communication of a signal between a first member mounted for rotation about an axis relative to a second member at all relative angular displacements between said first and second members, comprising:
   a first conductor having an first end mounted on said second member and having a second end mounted on said first member, said first conductor being adapted to convey a signal between its ends;
   a first motor operatively arranged to selectively rotate said first conductor first end through a desired angular displacement relative to said second member;
   a second conductor having an first end mounted on said second member and having a second end mounted on said first member, said second conductor being adapted to convey a signal between its ends;
   a second motor operatively arranged to selectively rotate said second conductor second end through a desired angular displacement relative to said first second member;
   an encoder for monitoring the angular displacement of said first member relative to said second member;
   a first divider/combiner communicating with the second end of each of said conductors;
   a second divider/combiner;
   a first connector mounted on said first member for selectively communicating said first and second divider/combiners through said first conductor;
   a second connector mounted on said first member for selectively communicating said first and second divider/combiners through said second conductor;
   a controller for selectively operating said first and second motors and said first and second connectors;
   whereby a signal may be conveyed though said joint at all angular displacements of said first member relative to said second member.

2. A rotary joint as set forth in claim 1 wherein said signal is electrical.

3. A rotary joint as set forth in claim 2 wherein said first and second conductors are electrical conductors.

4. A rotary joint as set forth in claim 1 wherein said signal is optical.

5. A rotary joint as set forth in claim 4 wherein said first and second conductors include optical fibers.

6. A rotary joint as set forth in claim 1 wherein said shaft assembly has a hollow axial throughbore.

7. A rotary joint as set forth in claim 1 wherein said signal passes from said first divider/combiner to said second divider/combiner.

8. A rotary joint as set forth in claim 1 wherein said signal passes from said second divider/combiner to said first divider/combiner.

9. A rotary joint as set forth in claim 1 wherein each connector includes two terminals for said signal, and includes a solenoid for selectively moving said terminals relatively toward and away from one another.

10. A rotary joint as set forth in claim 1 wherein said encoder is arranged to continuously monitor the angular displacement for said first member relative to said second member.

11. A rotary joint as set forth in claim 1 wherein said signal passes through one of said conductors.

12. A rotary joint as set forth in claim 11 wherein said signal does not pass through the other of said conductors.

13. A rotary joint as set forth in claim 11 wherein said signal passes through both of said conductors.

14. A rotary joint as set forth in claim 12 wherein the motor associated with said other of said conductors is operated to angularly displace such other conductor to a desired position relative to said second member.

15. A rotary joint as set forth in claim 14 wherein said controller selectively disables communication of said signal through said one of said conductors and enables communication of said signal through said other of said conductors when said first member has been angularly displaced through a predetermined distance relative to said second member.

* * * * *